April 26, 1966 M. V. McNUTT 3,248,034
SOLDERING IRON WITH ADJUSTABLE TIP
Filed Jan. 8, 1965 2 Sheets-Sheet 1
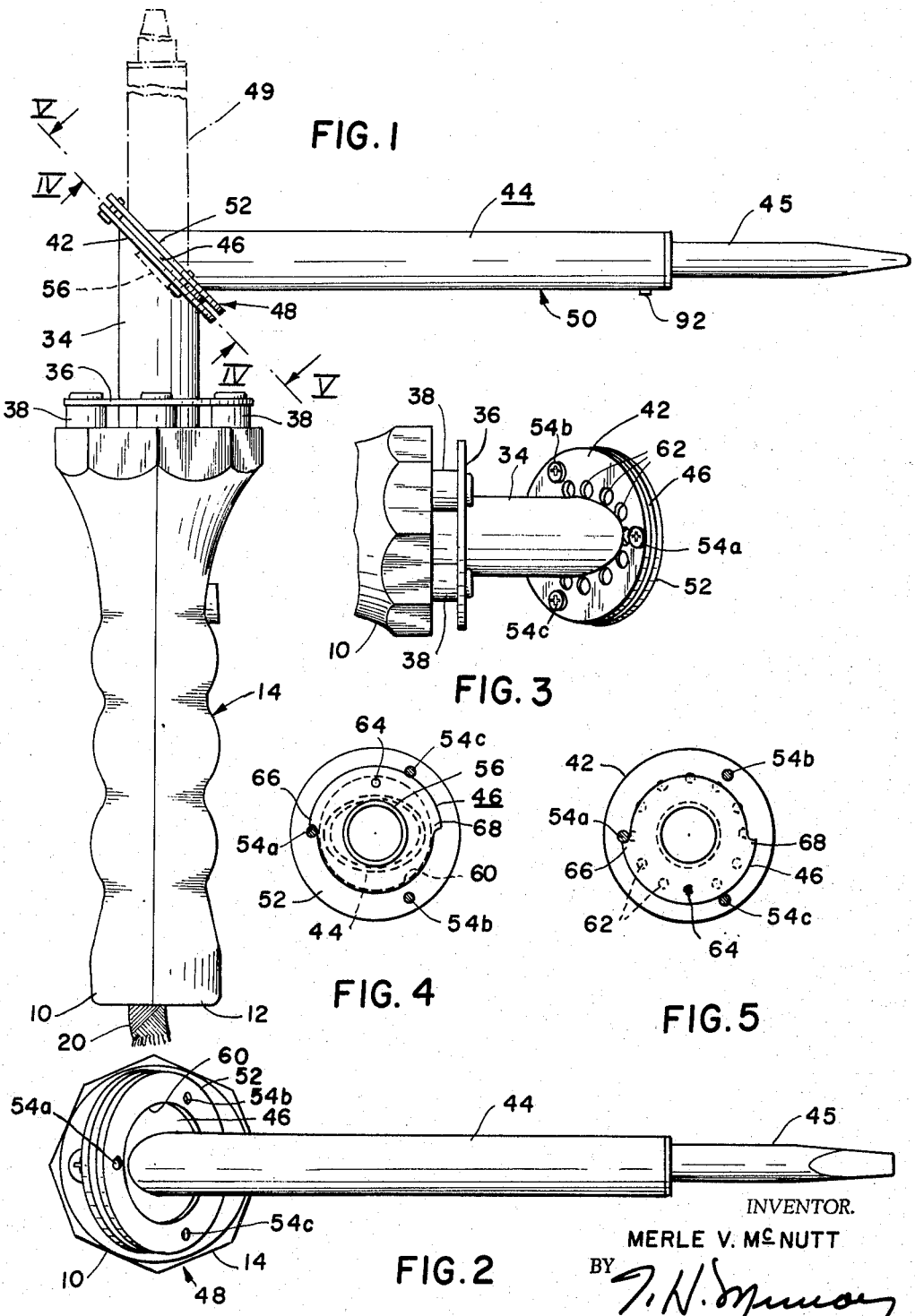
INVENTOR.
MERLE V. McNUTT
ATTORNEY April 26, 1966  M. V. McNUTT  3,248,034
SOLDERING IRON WITH ADJUSTABLE TIP
Filed Jan. 8, 1965  2 Sheets-Sheet 2

INVENTOR.
MERLE V. McNUTT
BY
ATTORNEY

United States Patent Office 3,248,034
Patented Apr. 26, 1966

---

3,248,034
SOLDERING IRON WITH ADJUSTABLE TIP
Merle V. McNutt, Grove City, Pa., assignor to Wall Manufacturing Company, Grove City, Pa., a corporation of Pennsylvania
Filed Jan. 8, 1965, Ser. No. 424,346
11 Claims. (Cl. 228—55)

The present invention relates to improvement in soldering irons in general, and more particularly to a heavy-duty soldering iron construction wherein the soldering tip is capable of a relatively wide angle of adjustment relative to the handle of the soldering iron in order to meet various production requirements where space is at a premium or where the items to be soldered are not readily accessible.

Most soldering irons, whether for production or for home workship use, are made in one of two general configurations. In the one type, the soldering tip or barrel is at more or less right angles to the handle such that the iron can be held in the hand of the user in a manner similar to that of a pistol. In the other type, the barrel or soldering tip is aligned with the handle. Both types of irons have application to specific types of soldering operations. However, the angularity of the handle and barrel or tip is not adjustable in the conventional soldering iron, and therefore it is frequently difficult to use the soldering iron in places where problems are encountered in correctly positioning the tip of the iron for a soldering operation either because of lack of available space for manipulating the iron or because of the particular location of those items to be soldered within a piece of equipment.

Accordingly, it is an object of the present invention to provide a soldering iron wherein the angularity between the handle and the soldering tip or barrel can be readily and reliably adjusted to suit specific soldering requirements.

In accordance with the aforementioned object of the invention, the means for adjusting the angular displacement of the barrel or tip relative to the handle of the iron is arranged such that, when a particular angular displacement is selected, the desired displacement between the two parts cannot be accidentally or inadvertently altered during continued use of the soldering iron.

It is another object of the invention to provide a soldering iron wherein the tip can be readily adjusted to a number of preselectable angular displacements relative to the handle thereof.

A further object of the invention is the provision of reliable locking means for ensuring the retention of the soldering iron tip in one of the aforementioned preselected positions reliably over a long period of continuous usage.

In the construction of an adjustable soldering iron thus far described, it is, of course, contemplated that the heating element or coil for the soldering iron tip will likewise be angularly displaced with the tip in order to provide continuous heat conductive contact therewith in the normal manner. However, inasmuch as the power cord of the soldering iron usually is conducted through the handle of the iron, it is necessary to provide some means for preventing undue accumulation of bending or twisting stresses in the heating element leads at the points where they pass through the adjusting means for the soldering iron. Otherwise, undue wearing of the insulation covering the leads at these points and possible electrical shorts will occur.

Accordingly, a further general object of the invention is the provision of an angularly adjustable soldering iron having means associated therewith for minimizing or preventing altogether undue bending or twisting of the electrical leads supplied therewith.

In accordance with the latter object of the invention, electrically insulated means are arranged in conjunction with the aforementioned angular adjustment means in order to afford proper protection to the electric leads at the points of their passage through the movable or adjustable parts of the soldering iron. Additionally, the electric leads are formed with a particular configuration which is designed to prevent the application of bending or twisting stresses in the electric leads particularly at electrical junctions or contacts made therein.

Therefore, still another object of the invention is the provision of an adjustable soldering iron having means associated therewith for protecting the electric leads thereof throughout the provided range of adjustments.

A further object of the invention is the provision of an adjustable soldering iron having a novel and efficient electrical insulator and composite electrical lead or conductor arrangement in the region of the adjusting means to prevent the application of undue bending or twisting stresses to the electric leads.

The foregoing and other objects, features and advantages of the invention will be elaborated upon during the forthcoming description thereof, with the description being taken in conjunction with the accompanying drawings, wherein:

FIGURE 1 is a side elevational view of one form of adjustable soldering iron arranged in accordance with the invention, with the view indicating the range of adjustability thereof;

FIG. 2 is an end elevational view of the adjustable soldering iron of FIG. 1 looking toward the handle thereof;

FIG. 3 is another end elevational view of the adjustable soldering iron of FIG. 1 looking toward the tip thereof;

FIG. 4 is a transverse sectional view of the adjustment means forming part of the soldering iron of FIG. 1 and taken along reference line IV—IV thereof;

FIG. 5 is another transverse sectional view of the adjustment means forming part of the soldering iron of FIG. 1 and taken along reference line V—V thereof;

Figures 6, 7, 8, 9:
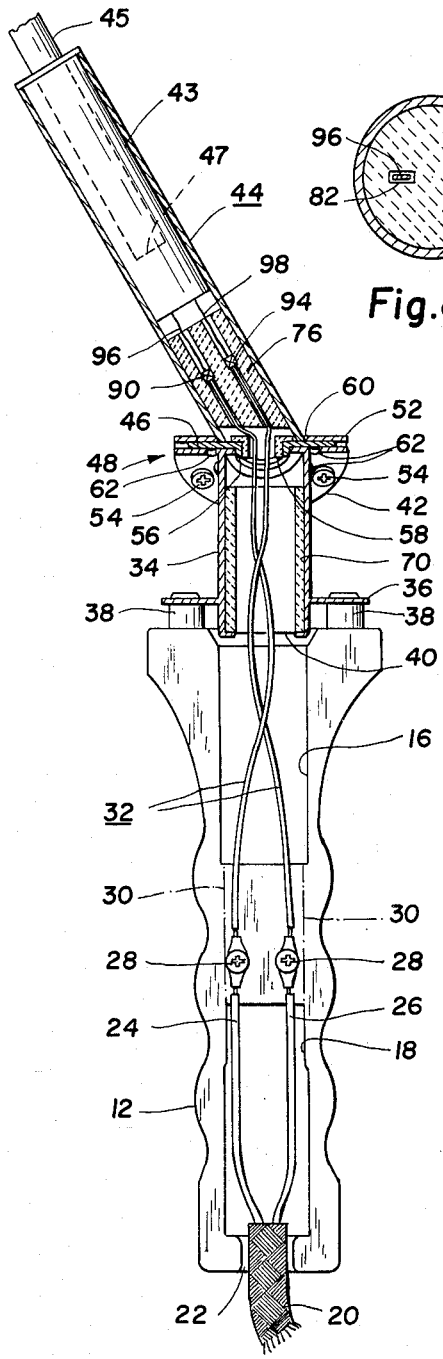
FIG. 6 is a longitudinally sectioned view of the adjustable soldering iron of FIG. 1 shown here in an intermediate angularly adjusted position.
FIG. 7 is an enlarged cross-sectional view of the composite electric lead and insulating arrangement of the invention.
FIGS. 8 and 9 are cross-sectional views taken along lines VIII—VIII and IX—IX, respectively, of FIG. 7.

Referring now more particularly to the drawings, the exemplary form of the invention illustrated therein comprises a bipartite handle structure composed of handle sections 10 and 12 and cooperating, when secured by suitable fasteners (not shown) to provide a circumferential handgrip contour denoted generally by the reference character 14 and to afford internal wire recesses 16 and 18, as better shown in FIG. 6 of the drawings. A power cord 20 inserted through an end opening 22 in the free end of the handle has the inner ends of its conductors 24 and 26 joined to screw terminals 28 mounted on a flat surface of one of the handle sections 12. The other handle section 10 preferably is provided with a recess (not shown) with the configuration denoted by reference lines 30 (FIG. 6) to permit closure of the handle sections without interfering with the terminals 28 and leads 24 and 26. A pair of heater element leads 32 connected to the respective terminals 28 extend through the handle recess 16 and, leaving its open front end, are inserted into a first flanged barrel section 34.

The barrel section 34 is provided with a first outwardly extending peripheral mounting flange 36 secured adjacent the handle end of the barrel section 34 to four mounting studs 38 molded integrally with the handle sections 10 and 12. In this arrangement, the handle end of the barrel section 34 extends slightly into the wire recess 16 of the handle as denoted by reference character 40 to prevent injury to the heater leads 32 therein. On the other hand, the mounting flange 36 and the end 40 of the barrel section 34 are spaced from the body of the handle in order to minimize the transference of heat to the handle and thus to promote operator comfort.

The other end of the barrel section 34 terminates in a circular flange 42 which is inclined at an angle to the axis of the barrel section 34. An outer barrel section 44 of the soldering iron also terminates in a similarly inclined circular flange 46 at the handle end of the outer section 44. The inclined flanges 42 and 46 form the major components of the angular adjustment means 48 of the soldering iron and will be elaborated upon more fully below.

The outer barrel section 44 additionally contains adjacent its outer end portion an electric heating coil 43 (FIG. 6) and a soldering tip 45 having its inward end inserted into a longitudinal recess 47 in the coil 43 for heating purposes.

For the present, it well may be pointed out that the circular flanges 42 and 46 in this arrangement are each disposed at an angle of 45° to the respective axes of the inner and outer barrel sections 34 and 44. As better shown in FIG. 1, this particular angular disposition of the flanges 42 and 46 permits a range of angular adjustment of the outer barrel section 44 from a position in axial alignment with the handgrip 14 as denoted by the phantom outline 49 of FIG. 1 to a position at right angles to the handgrip 14 as denoted at reference character 50 in FIG. 1. It will be appreciated that in moving between these limits of adjustability that, assuming the handgrip 14 is held motionless, the outer barrel section 44 will be rotated 180° and will generate a quarter conic section with its apex substantially at the center of the flanges 42 and 46. It will be appreciated, of course, that in other applications of the soldering iron it may be desirable to dispose the flanges 42 and 46 at some other angle to their respective barrel sections, for example, 30°. In the latter case, the outer barrel section 44 will then be adjustable from a position of alignment with the handgrip 14 and an extreme angular displacement of 60° relative thereto, in a manner analogous to the foregoing.

Returning now to the constructional details of the angularly adjustable joint structure 48, one arrangement for retaining the inclined outer barrel flange 46 against the inclined inner barrel flange 42 will now be described as illustrated in FIGS. 2–6 of the drawings. As shown, an annular clamping plate 52 is placed against the tip side of the inclined flange 46 and is retained in this position by three mounting screws 54a, 54b and 54c inserted through suitable openings therefor in the inclined inner barrel flange 42. The other inclined flange 46 is furnished with a smaller outer diameter so as to clear the mounting screws 54 (except as noted hereinafter) which are then threaded into suitable tapped openings of the clamping plate 52.

When thus assembled, the inclined outer barrel flange 46 is provided with a short normally extending tubular section 56 which is closely fitted into a circular opening of the inner inclined flange 42, as better shown in FIG. 6 of the drawings. This arrangement minimizes wearing contact upon the coil leads 32 extending through the tubular extension 56. In accordance with another feature of the invention, the electric leads 32 are further protected by an electrical ceramic insulator 58 associated with the tubular extension 56 and described hereinafter in greater detail.

Returning now to the joint structure 48, it is contemplated in accordance with one arrangement of the invention that the outer barrel section 44 be provided with infinite adjustment between the limits denoted in FIG. 1 by the mere frictional clamping of its inclined flange 46 between the flange 42 and the annular clamping plate 52. The clamping plate 52 is, of course, provided with a central opening 60 sufficiently larger than the outer diameter of the barrel section 44 inasmuch as the latter is, in this example, always inclined at an angle of 45° to the plate 52.

In the illustrated arrangement of the invention, however, it is contemplated that a suitable locking means be associated with the angularly adjustable joint 48 to permit the joint 48 to be locked in either of the positions of the outer barrel section 44, shown in FIG. 1 and in a number of preselected positions therebetween. One form of such locking means is illustrated more particularly in FIGS. 4–6 of the drawings, wherein the inner inclined flange 42 is provided with a number of indexing openings 62. In this arrangement of the invention, a dozen such openings 62 are provided and are arranged in a concentric circular array in the circular inclined flange 42. It will be appreciated, of course, that a greater or lesser number of such openings can be provided depending upon space limitations and operational requirements of the soldering iron. Moreover, it will become apparent as this description proceeds that only a little more than half of the openings 62 are utilized in indexing the angular displacement for alignment of the outer barrel section 44, with the remainder of the openings being furnished to complete the circular array for symmetry of the inclined flange 42 and attendant facilitation of the assembly thereof.

Referring now specifically to FIGS. 4 and 7 of the drawings, the locking means, according to one arrangement of the invention, includes a dimple or projection 64 formed on the inclined outer barrel flange 46 on the side thereof adjacent the inner inclined flange 42, and sized so as to be projectable into any of the openings 62. Thus, when the fastening means 54 are tightened, the engagement of the projection 64 with one of the openings 62 positively locks the inclined flanges 42 and 46 against relative rotation and thereby positively locks the outer barrel section 44 in that position determined by the engagement of the projection 64 in a preselected one of the openings 62.

In order to ensure that the outer barrel section 44 is always adjusted through the same conic section described above and thereby to prevent continued or 360° twisting of the leads 32, the outer inclined flange 46 is provided with a pair of diametrically opposed stops 66 and 68 (FIGS. 4 and 5) so that the outer inclined flange 46 can never be rotated more than 180° relative to the inner inclined flange 42 in a given rotational direction. One of the mounting screws 54a is displaced inwardly from the outer periphery of the flange 42 relative to the remaining mounting screws 54b and 54c where it cooperatively engages the stops 66 and 68 to thereby determine the rotational limits of the outer inclined flange 46 relative to the inner flange 42.

With reference now to FIGS. 6–9 of the drawings, the electrical insulator and composite conductor arrangement is illustrated for purposes of protecting the heater element leads 32 particularly where they pass through the joint structure 48, and of minimizing twisting and bending stresses imparted thereto. It will be noted that the barrel section 34 is provided with an inner cylindrical ceramic insulator 70 held in place by bending down a small lip 72 on the lower end of the barrel section 34. As was mentioned above, the tubular extension 56 on inclined flange 46 is fitted with a ceramic insulator 58. As shown in FIG. 7, the insulator 58 has an annular shoulder 74 on the upper end thereof such that it may be inserted into the tubular extension 56 from the tip end of the soldering iron without passing entirely through the tubular extension. The central opening in bushing 58 is provided with rounded edges and a glazed surface to reduce abrasion on the wire.

Above the ceramic insulator 58 is a ceramic plug 76 carried within the outer barrel section 44 and held in place by means of an ear 78 punched into the wall of element 44 such that it projects into a key slot 80 in the ceramic plug 76. When thus positioned, the ceramic plug 76 prevents the ceramic insulator 58 from coming out of the tubular extension 56 in element 46.

As best shown in FIGS. 8 and 9, rectangular holes 82 and 84 are formed in the upper portion of the ceramic plug 76; and these rectangular holes communicate with circular holes 86 and 88, respectively, formed in the lower portion of the ceramic plug. The heater element leads 32, at their upper ends, pass through the circular openings 86 and 88 in the lower portion of the ceramic plug 76 and are connected by means of crimped rectangular electrical clamps 90 and 94 to uninsulated flat connecting leads 96 and 98 connected to the heating element 43 for the soldering iron.

In assembling the soldering iron, the flat leads 96 and 98 are intially clamped to the upper ends of the leads 32. Thereafter, the leads 32 are threaded through holes 82–86 and 84–88, respectively, and pulled downwardly until the rectangular clamps 94 are lodged within the rectangular holes 82 and 84 respectively. Finally, the leads 32 are secured to the terminals 28. It will be noted that the leads 32 are relatively loosely fitted within the barrel section 34; and since the wires cannot turn nor twist above the clamps 90 and 94, any turning or twisting must occur at that region of the leads 32 where they are relatively free to turn without imparting severe stresses therein. Furthermore, the insulators 58 and 70 prevent damage to the insulation on the leads 32 in the event that they rub against the internal parts of the barrel assembly during turning of the barrel section 44. This, of course, is an important feature of the invention since, otherwise, repeated turning of the barrel section 44 with respect to section 34 would eventually damage the leads 32.

Although the invention has been shown in connection with a certain specific embodiment, it will be readily apparent to those skilled in the art that various changes in form and arrangement of parts can be made to suit requirements without departing from the spirit and scope of the invention.

I claim as my invention:

1. An adjustable joint means for a soldering iron or the like, said means including a first generally circular flange secured at an angle to the end of an outer barrel section and tip assembly of said soldering iron, a second inclined flange secured at an angle to the end of an inner barrel and handle assembly of said soldering iron, said second flange extending peripherally outwardly of said first flange but engaging the adjacent surface of said first inclined flange, an annular clamping plate inserted over said outer barrel and tip assembly and engaging the other side of said first inclined flange, and fastening means secured to said second flange and said clamping plate to clamp said first flange therebetween in a given rotational position thereof relative to said second flange to determine the angular displacement of said outer barrel and tip assembly relative to said inner barrel and handle assembly.

2. An adjustable joint means for a soldering iron or the like, said means including a first generally circular flange secured at an angle to the end of an outer barrel section and tip assembly of said soldering iron, a second inclined flange secured at an angle to the end of an inner barrel and handle assembly of said soldering iron, said second flange extending peripherally outwardly of said first flange but engaging the adjacent surface of said first inclined flange, and means for clamping said first inclined flange against said second inclined flange in a given rotational position relative thereto to determine the angular displacement of said outer barrel and tip assembly relative to said inner barrel and handle assembly.

3. An adjustable joint means for a soldering iron or the like, said means including a first generally circular flange secured at an angle to the end of an outer barrel section and tip assembly of said soldering iron, a second inclined flange secured at an angle to the end of an inner barrel and handle assembly of said soldering iron, said second flange extending peripherally outwardly of said first flange but engaging the adjacent surface of said first inclined flange, and means for clamping said first inclined flange against said second inclined flange in a given rotational position relative thereto to determine the angular displacement of said outer barrel and tip assembly relative to said inner barrel and handle assembly, and cooperating locking and indexing means on said inclined flanges for locking said first inclined flange to said second flange in any one of a number of predetermined rotational positions relative thereto.

4. In a soldering iron the combination comprising a first barrel section spacedly joined near one end thereof to a handle member and having the other end thereof terminating in a circular flange secured at an angle thereto, a second barrel section containing a soldering tip and heater element assembly adjacent one end thereof and having its other end terminating in an inclined flange in engagement with said first-mentioned flange, and means for aligning said second flange substantially coaxially with said first flange and for clamping said second flange thereto in a given rotational position thereof relative to said first flange to determine the angular displacement of said second tubular section and tip assembly relative to said first tubular section and handle assembly.

5. In a soldering iron the combination comprising a first barrel section spacedly joined near one end thereof to a handle member and having the other end thereof terminating in a circular flange secured at an angle thereto, a second barrel section containing a soldering tip and heater element assembly adjacent one end thereof and having its other end terminating in an inclined flange in engagement with said first-mentioned flange, said second flange having a tubular extension disposed thereon at a position substantially coaxially of said inclined flanges and closely fitted in a central opening in said first inclined flange to maintain a substantially coaxial alignment of said flanges and to afford a certain amount of protection for electrical leads inserted therethrough, and means for clamping said flanges together in a preselected rotational position to determine the angular disposition of said second tubular section and soldering tip relative to said first tubular section and handle.

6. In a soldering iron the combination comprising a first barrel section spacedly joined near one end thereof to a handle member and having the other end thereof terminating in a circular flange secured at an angle thereto, a second barrel section containing a soldering tip and heater element assembly adjacent one end thereof and having its other end terminating in an inclined flange in engagement with said first-mentioned flange, means for substantially coaxially aligning said inclined flanges, one of said flanges having a smaller outer diameter than the other of said flanges, an annular clamping ring disposed adjacent said smaller flange, and fastening means disposed outwardly of said smaller flange and engaging said clamping ring and said other flange to clamp said flanges together in a preselected rotational position thereof to determine the angular displacement of said outer tubular section and soldering tip realtive to said inner tubular section and handle.

7. An adjustable joint means for a soldering iron or the like, said means including a first generally circular flange secured at an angle to the end of an outer barrel section and tip assembly of said soldering iron, a second inclined flange secured at an angle to the end of an inner barrel and handle assembly of said soldering iron, said second flange extending peripherally outwardly of said first flange but engaging the adjacent surface of said first inclined flange, and means for clamping said first inclined flange against said second inclined flange in a given rotational position relative thereto to determine the angular displacement of said outer barrel and tip assembly relative to said inner barrel and handle assembly, a pair of opposed stop members formed on the outer periphery of said smaller inclined flange, said stop members being disposed to engage one of said fastening means to limit the rotational displacement of said second flange relative to said first flange.

8. In a soldering iron the combination comprising a first barrel section spacedly joined near one end thereof to a handle mamber and having the other end thereof terminating in a circular flange secured at an angle thereto, a second barrel section containing a soldering tip and heater element assembly adjacent one end thereof and having its other end terminating in an inclined flange in engagement with said first-mentioned flange, said second flange having a tubular extension disposed thereon at a position substantially coaxially of said inclined flanges and closely fitted in a central opening in said first inclined flange to maintain a substantially coaxial alignment of said flanges and to afford a certain amount of protection for electrical leads inserted therethrough, said first inclined flange having a circular array of indexing openings arranged substantially concentrically of the central opening therein, said second inclined flange having an indexing projection arranged for cooperative engagement in said openings to lock said flanges in corresponding rotational positions thereof, and means for clamping said flanges together in a preselected one of said rotational positions to determine the angular disposition of said second tubular section and soldering tip relative to said first tubular section and handle.

9. In a soldering iron the combination comprises a first barrel section spacedly joined near one end thereof to a handle member and having the other end thereof terminating in a circular flange secured at an angle thereto, a second barrel section containing a soldering tip and heater element assembly adjacent one end thereof and having its other end terminating in an inclined flange in engagement with said first-mentioned flange, said second flange having a tubular extension disposed thereon at a position substantially coaxially of said inclined flanges and closely fitted in a central opening in said first inclined flange to maintain a substantially coaxial alignment of said flanges and to afford a certain amount of protection for electrical leads inserted therethrough, said first inclined flange having a circular array of indexing openings arranged substantially concentrically of the central opening therein, said second inclined flange having an indexing projection arranged for cooperative engagement in said openings to lock said flanges in corresponding rotational positions thereof, one of said inclined flanges having a smaller outer diameter than that of the other of said flanges, an annular clamping ring engaging said smaller flange and secured to the other of said flanges by a plurality of mounting screws disposed adjacent the outer periphery of said smaller flange, said smaller flange having a pair of opposed stop members spacedly formed on its outer periphery to determine the limits of rotational displacement of said smaller flange relative to said other flange, one of said mounting screws being positioned inwardly relative to the remaining mounting screws to engage said stop members, and said clamping ring and said mounting screws, and means for clamping said flanges together in a preselected one of said rotational positions to determine the angular disposition of said second tubular section and soldering tip relative to said first tubular section and handle.

10. In a soldering iron the combination comprising a first barrel section spacedly joined near one end thereof to a handle member and having the other end thereof terminating in a circular flange secured at an angle thereto, a second barrel section containing a soldering tip and heater element assembly adjacent one end thereof and having its other end terminating in an inclined flange in engagement with said first-mentioned flange, said second flange having a tubular extension disposed thereon at a position substantially coaxially of said inclined flanges and closely fitted in a central opening in said first inclined flange to maintain a substantially coaxial alignment of said flanges, an electrical insulator closely fitted in said tubular extension for movement therewith, said insulator having an opening extending therethrough for receiving electrical leads inserted therethrough to prevent their contact with the adjacent portions of said flanges, and means for clamping said flanges together in a preselected one of said rotational positions to determine the angular disposition of said second tubular section and soldering tip relative to said first tubular section and handle.

11. In a soldering iron the combination comprising a first barrel section spacedly joined near one end thereof to a handle member and having the other end thereof terminating in a circular flange secured at an angle thereto, a second barrel section containing a soldering tip and heater element assembly adjacent one end thereof and having its other end terminating in an inclined flange in engagement with said first-mentioned flange, said second flange having a tubular extension disposed thereon at a position substantially coaxially of said inclined flanges and closely fitted in a central opening in said first inclined flange to maintain a substantially coaxial alignment of said flanges, an electrical insulator having at least a portion thereof closely fitted within said second barrel section for movement therewith, a pair of conductive ribbons closely fitted in respective rectangular logitudinal openings therefor extending through said insulator to prevent the application of bending or twisting stresses to said conductive ribbons, electrical leads for said soldering iron joined respectively to said conductive ribbons, and means for clamping said flanges together in a preselected one of said rotational positions to determine the angular disposition of said second tubular section and soldering tip relative to said first tubular section and handle.

References Cited by the Examiner

UNITED STATES PATENTS 2,630,114   3/1953   Hart _____ 287—14

FOREIGN PATENTS 149,262   10/1821   Great Britain.

WHITMORE A. WILTZ, *Primary Examiner.*

M. L. FAIGUS, *Assistant Examiner.*